US005724751A

United States Patent [19]

Ellingsen

[11] Patent Number: 5,724,751

[45] Date of Patent: Mar. 10, 1998

[54] PROCESS AND APPARATUS FOR DRYING ORGANIC OR INORGANIC MATERIALS

[75] Inventor: Olav Ellingsen, Florø, Norway

[73] Assignee: Thermtech A/S, Floro, Norway

[21] Appl. No.: 666,567

[22] PCT Filed: Jan. 7, 1994

[86] PCT No.: PCT/NO94/00005

§ 371 Date: Jul. 2, 1996

§ 102(e) Date: Jul. 2, 1996

[87] PCT Pub. No.: WO95/18946

PCT Pub. Date: Jul. 13, 1995

[51] Int. Cl.[6] .................... F26B 3/00

[52] U.S. Cl. .................... 34/354; 34/401; 34/593; 34/59; 34/147; 34/179

[58] Field of Search .................... 34/252, 262, 354, 34/401, 593, 59, 63, 95, 108, 147, 166, 179, 183, 236

[56] References Cited

U.S. PATENT DOCUMENTS

| | | | |
|---|---|---|---|
| 3,395,905 | 8/1968 | Isheim et al. | 34/63 |
| 3,808,701 | 5/1974 | Bachmann | 34/179 |
| 4,173,608 | 11/1979 | Soulier | 34/262 X |
| 4,860,462 | 8/1989 | Gobel | 34/108 |

FOREIGN PATENT DOCUMENTS

| | | |
|---|---|---|
| 1458312 | 12/1976 | United Kingdom . |
| 9311396 | 6/1993 | WIPO . |

OTHER PUBLICATIONS

English Translation of Text From p. 5, line 26 through p. 6, line 8 of WO 9311396.

*Primary Examiner*—John M. Sollecito
*Assistant Examiner*—Steve Gravini
*Attorney, Agent, or Firm*—Ladas & Parry

[57] ABSTRACT

A method of drying organic or inorganic material or a mixture thereof, said material containing a liquid or liquids, which comprises introducing said material interiorly of a rotating rotor carrying on its periphery oscillating rotor blades, said rotor rotating about the axis of a process chamber having an inner surface with substantially axially extending ribs, said rotating rotor causing the material introduced interiorly of said rotor to be propelled radially outwardly of said axis of rotation and to expel liquid or liquids from said materials, and the oscillating rotor blades and the opposing ribs causing vibrational forces and turbulence to be induced into the outwardly flowing liquid so as to form a mist. Apparatus for carrying out said method is also described.

11 Claims, 4 Drawing Sheets

PROCESS AND APPARATUS FOR DRYING ORGANIC OR INORGANIC MATERIALS

The invention relates to a method of drying materials, as disclosed in the preamble of Patent Claim 1. The invention further relates to a device for Implementation of the drying organic or inorganic materials or mixtures thereof, said materials containing one or more liquids, wherein drying is carried out by removing said liquid or liquids as atomized droplets from the solid material and apparatus for carrying out said method.

Thus the invention relates to a method of removing liquids (drying) from various atomized organic or Inorganic materials by transforming part of the liquids into mist acting as vapour or gas, thus saving evaporation heat, reducing energy consumption dramatically compared to pure evaporation of the same liquids.

In principle, all the techniques or processes of the prior art relating to the removal of liquids from such atomized materials are based either on mechanical separation through cetrifugation, sedimentation etc., or some other form of total evaporation of the liquids in the material. This invention aims to show a new way of removing liquids from the materials described in the literature as drying, after part of the liquids may have been removed by the first-mentioned techniques.

The literature cites a number of different drying systems, in general comprising various ways of supplying energy to the materials with a view to evaporation of the liquids. The reason for this need for different techniques has to do with the type of material, the atomization of the particles, the type of liquid, and not least the thermodynamic values of the materials throughout the process.

The simplest and most trivial kind of drying is seen in the outdoor drying of washing. Here the clothes are dried under the influence of sun and wind.

Amongst others, the prior art comprises the following drying methods and processes:

Rotary drying, where the energy is either supplied through a flame blown into the dryer—a so-called through-heat dryer, or by means of thermal conductance elements of various designs (pipes, plates etc.)—a so-called oil or steam dryer.

Fluidized dryer which normally consists of a vertical cylinder with a cloth, or some other perforated plate in the bottom, through which is blown some kind of heated gas, heating the material and expelling the liquids through evaporation.

There is furthermore infrared dryer where the energy is delivered as infrared radiation, different types of tunnel furnaces, and so-called "turbo-driers" where the material is dried in a vertical cylinder by means of spinning fans and a countercurrent of hot air or some other heated gas.

The processes which are well known from the prior art and described in detail in a number of textbooks such as PERRY'S CHEMICAL ENGINEERING HANDBOOK, are used for a number of drying purposes.

The problem with all the methods is that the evaporation of the liquids requires so much energy that the finished product would normally need to be of a considerable commercial value, far in excess of the drying cost.

However, there are now a number of different mixtures of materials/liquids where this is not the case; nevertheless it would be a great advantage for various reasons to dry these, notably for environmental reasons. Such mixtures of materials/liquids might for example include:

All types of aqueous sludge from municipal plants.

Ordinary sewage waste.

Livestock manure.

All types of filtrates from centrifuges containing liquids.

Various biological and chemical compounds from refineries, wood processing, and the food industry etc.

Most of these materials are characterized by being normally regarded as waste, thus being normally viewed as not worth the costly drying-by-evaporation process.

The objective of the present invention is to provide a process or a method of drying such materials using less energy than current drying processes, in that the liquids are not evaporated but removed through the transformation of a considerable portion of the said liquids into mist.

In the evaporation of a liquid, the energy requirements are expressed by the following equation:

$$Q=m\cdot c\cdot dt\ [J]$$

Here Q is the energy requirement in Joule, m the mass of the liquid in kg c the specific heat of the liquid in J/k °C. and dt is the temperature difference between the evaporation temperature and the initial temperature of the liquid.

In evaporation of water, the equation is often expressed by:

$$Q=m.dh=m(h_2-h_1)+k\ [J]$$

Here $h_2$ is the enthalpy of the steam at evaporation temperature and $h_1$ is the enthalpy of the water at the temperature of the feed, i.e. the temperature of the water when it is fed into the process along with the solids, and k equals the loss in the process.

If we look at a quantity of sludge with water, the equation is expanded to:

$$Q=m\cdot x_s\cdot c_s\cdot dt+m\cdot x_v(h_2-h_1)+k=m[x_s\cdot c_s\cdot dt+x_v\cdot(h_2-h_1)]+k[J]$$

Here $x_s$ is the weight proportion of solids, $c_s$ is specific heat of the solids and $x_v$ is the weight proportion of the water. If there are several different solids in the material, the equation is expanded for each solid ingredient with its respective weight proportion and specific heat.

Looking at a typical sludge from the wood processing industry, containing 30% fibre and 70% water, given that dt=100–20=80° C. $c_s$=1500 j/kg°C.=1.5 kJ/kg°C., $h_2$=2.676,000 J/kg°C.=2.676 kJ/kg°C. and $h_1$=83,900 J/kg°C.=83.9 kJ/kg°C., the energy consumption per kg will be:

$$Q=1[0.3\cdot 1.5\cdot 80+0.7(2676-83.9)]=1{,}850\ kJ/kg=1{,}850{,}000\ kJ/ton=514\ kWh/ton\ net.$$

Added to this will be the thermal losses from the process which may vary from 10% and upwards to several hundred percent. An energy consumption of 3 times the net amount is not unusual.

If we now look at the energy required to transform water into mist, the starting point must be the size of the mist droplets, which is between 0.01 and 10 μm. If we elect to use (0.01+10)/2=5 μm as a kind of average, then one liter of water may form a number of mist droplets expressed by:

$$N = V/dV \text{ where } V \text{ is the volume of one liter of water} = 100{,}000^3\ \mu m^3 \text{ and } dV \text{ is the volume of each droplet} = d^3\pi/6.$$

Of which:

$$N = 1000{,}000^3 \cdot 6/5^3\mu = 1.53 \cdot 10^{13}$$

The energy required to form these droplets can be assumed to equal the energy of the total surface tension between water and air. The surface tension of pure water is $\sigma_v$=71.4 dyn/cm=7140 dyn/m=7140 dyn·m/m$^2$=7140·10$^{-5}$ Nm/m$^2$=7145·10$^{-5}$ J/m$^2$. The total surface of the mist droplets is:

$$A_{tot} = N \cdot d^2\pi = 1.53 \cdot 10^{13} \cdot (5 \cdot 10^{-6})^2 \pi = 1200 \text{ m}^2$$

Total energy is:

$$Q_{tot} = A_{tot} \cdot \sigma_v = 1200 \cdot 7145 \cdot 10^{-5} = 85.74 \text{ J/kg} = 85{,}740 \text{ J/ton} = 85.74 \text{ kJ/ton}.$$

This is in the order of magnitude of approx. 20,000 times less energy than by pure evaporation of water.

This phenomenon is currently being used for devices such as so-called humidifiers. Earlier models were based on pure evaporation, in that an electric immersion heater was arranged in a container heating the water until it boiled and evaporated. In present-day models the electric immersion heater is replaced by a piezo-electric crystal oscillating at approx. 20 kHz. When a drop of water hits the crystal, it cavitates into millions of tiny water droplets together forming a mist which humidifies the room at room temperature.

The frequency of the sonic power required to achieve this is given by F. D. Smith as $$f = [1/(2\pi)]/[\{3\pi(P_o + 2\sigma/r)\}/o]^{0.5}$$

where r is the radius of the droplets, μ is the specific heat of the gas in the droplets, $P_o$ is the external hydrostatic pressure, o is the specific weight (density) of the liquid and σ is the surface tension between liquid and gas.

The equation relates to the cavitation in a liquid when it is exposed to sonic energy. Calculations for differently sized droplets show that the frequency would reside in the area of $10^4$ to $10^6$ Hz.

The materials to be dried are not, however, a homogeneous mass. They might consist of a number of different materials as well as one or more different types of liquids, although the predominant proportion would usually be water.

It is common knowledge that the liquids in such mixtures may exist as a free moveable liquid and as liquid bound by physical forces in the materials, consisting predominantly of capillary forces. In order to conquer these forces in a normal drying process, the steam pressure needs to conquer the capillary pressure which Increases in proportion to the diminishing pore structure. In an ordinary drying process. This is achieved by drying the material at a temperature such that the steam pressure conquers the capillary pressure. This will frequently require temperatures far above what is strictly necessary for evaporation. Another aspect affecting pure thermal drying is the fact that the thermodynamic values of the material change durlng the process. They worsen. This must In its turn be compensated by higher temperatures and larger heating surfaces, which again leads to higher cost of equipment and operations.

In order to achieve the objective of this invention—the drying as a combination of mist formation and evaporation, the elements supplying the sonic and thermal energy to the material need to be able to supply these under such turbulent conditions that all parts of the material are treated. By rendering the material into an extremely turbulent state, we will not only have conditions with approximately constant thermodynamic data, but we will also prevent the mass from getting entrenched in the process chamber and its constituent parts—which is a major problem in all other drying processes of the prior art.

In order to achieve the above conditions, a process is proposed consisting of the following elements:

In a vertical or horizontal cylindrical container, an agitator is arranged driven by a rotating source of energy—an electric engine or combustion engine. On the agitator are devised a series of pivotally supported blades which, when the rotor rotates, are flung outwards by the centrifugal force. The material is also flung outwardly by the centrifugal force and the liquid is thus removed from the solid material.

On the process chamber itself, an input opening is provided deviced for the material which is to be dried, an output opening for the dried material, and an opening for the evacuation of steam and mist.

In order to supply sonic energy to the turbulent mass, the following procedure may be applied:

On the inside of the process chamber, ribs are arranged running lengthwise over the whole internal periphery of the chamber. The ribs are shaped so as to be approximately parallel with the blades where they pass the ribs. When the rotor rotates at n RPM having N blades per arm, each revolution will cause n·N pressure impulses between the rib and the blade, which are transferred to the turbulent mass in the chamber. With e.g. a diameter of 2 m and 179 ribs at 35 mm intervals, 12 blades around the rotor running at 2500 RPN, pressure waves will be generated from each blade at a frequency of 179·2500/60=7458 pulses per sec. These pressure waves will rip up the liquid and make a substantial portion of it cavitate and form mist. In addition, heat will be generated from the blades due to internal friction in the mass and additionally by the supply of heated air or another gas, e.g. $CO_2$ from a combustion engine. With these added gases, the mist will cause the generation of extremely low partial pressure in the process chamber for the evaporating portion of the liquid. Experiments have shown that the partial pressure for the vapours will be so low as to give evaporation from 40°–75° C.

The gases, mist and steam leaving the process chamber through the output opening from these may either condense or be led to air—depending on the nature of the gases.

Another way of increasing the frequency and thus the mechanical effect on the liquids, is to design the blades as tuning forks, so as to be set in natural oscillation on passing the ribs, thus contributing to the sonic energy. As an alternative to the purely mechanical effect on the tuning forks, they may be electro-magnetically stimulated by a magnetic oscillator arranged on the outside. This is devised so as to allow the magnetic field to go through the wall of the process chamber by designing the said chamber in a non-magnetic material (such as stainless steel).

The magnetic field will affect each of the blades designed as an oscillating element at the same frequency as the magnetic field. A further way of reinforcing the effect would be to arrange a magnetostrictive material on the blades, such as "Terfonol$^{R}$" made from the elements ferrum, terbium and dysprosium. Under the influence of a magnetic field, the alloy will expand by approx. 1–2 o/oo. This expansion may directly influence the blades and thus the material to be treated.

Yet another method of establishing a strong sonic field in the process chamber is to mount the ribs on piezoelectric ceramics or magnetostrictive materials. When the correct impedance is established between the mass of the ribs, it will be possible by means of a frequency modulator on the outside to make the ribs oscillate at any chosen frequency within the practical range in question. In the frequency range of 20,000 Hz no movement will be observable in the ribs, as they will be oscillating around their elasticity range.

Other ways of supplying vibrations may be envisaged, such as designing the blades to give off a sound analogous to that of a whistle during movement in the mass. This can be achieved simply and practically by designing the backs of the blades so as to form extreme turbulence behind the said blades. Apart from giving off vibrations, the turbulence will also form a lagging vacuum which will render mist formation and evaporation more efficient at a low temperature.

Experiments have shown that it is possible to reduce the energy consumption to less than half of the theoretical energy consumption for drying e.g. wood fibre sludge.

The process is automatically governed by the following parameters:

Process temperature.

Lead on the engine.

Humidity of the dried material.

In other words, the output of dried material starts at a selected operating temperature and humidity. The resulting reduced load on the engine will cause input to start until the load again peaks. During input, the temperature drops and output begins. In a correctly adjusted plant, this will be continuous, so that input will balance output, i.e. output and input will be continuous.

The process is shown in detail in the subsequent drawings, where:

Figure 1:
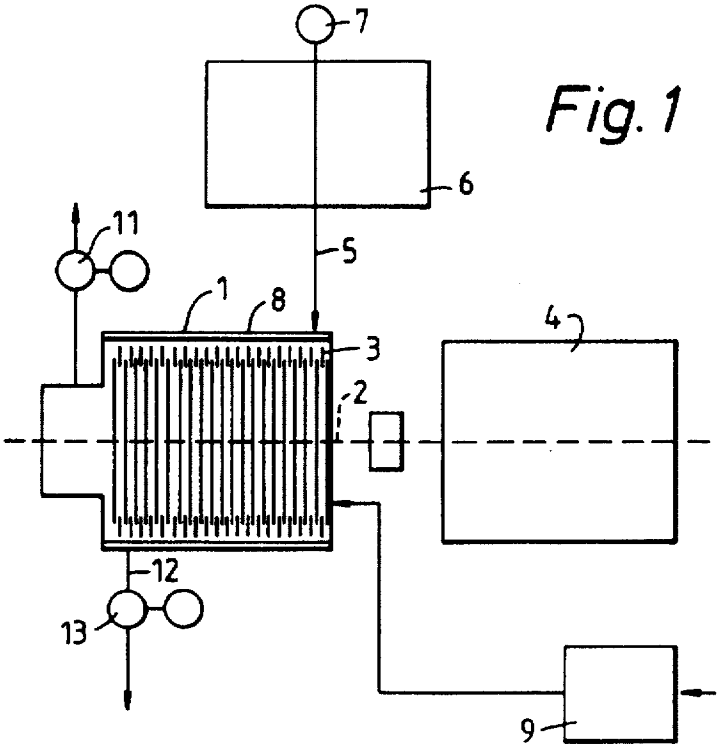
FIG. 1 shows a schematic view of the process.

FIG. 1 shows a process chamber with rotor 2 and blades 3 driven by the engine 4. The mass is fed into the process chamber by the feed conveyor 5 from the hopper 6. The feed conveyor is driven by the engine 7. The mass in the process chamber is whipped by the blades S and subjected to sonic energy or vibrations from the said blades and the ribs 8, which are sufficiently closely spaced to each other to cause turbulence during the rotation of the blades. As additional energy may be supplied some form of heated gas from the combustion engine 9. The gases, mist and vapours leave the process chamber 1 via the output opening via a vent fan 11 and on to either open air or to a condenser. The dried material is led through the output opening 12 via the rotating gate 13.

Figure 2:
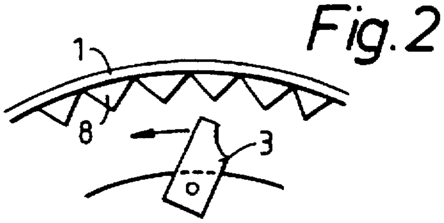
FIG. 2 shows a detail of the process chamber and the blade at the moment of passing.

FIG. 2 shows, as mentioned, a detail of the process chamber and the blade at the moment of passing.

Figure 3:
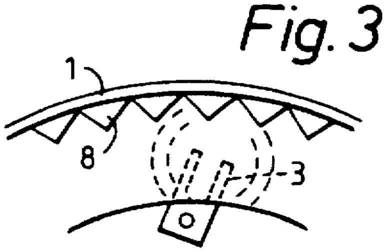
FIG. 3 shows a detail of one of the blades designed as a tuning fork.

FIG. 3 shows a detail of one of the blades designed as a tuning fork.

Figure 4:
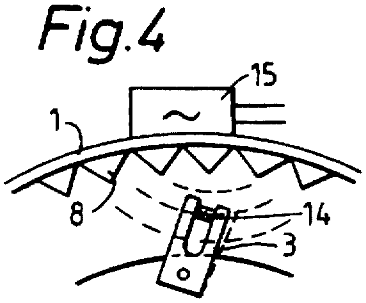
FIG. 4 shows the same fork prestressed with the magnetostrictive material "Terfonol$^R$" with an oscillating magnet generator.

FIG. 4 shows the same tuning fork prestressed with the magnetostrictive material Terfonol$^R$ 14, with an oscillating magnet generator 15.

Figure 5:
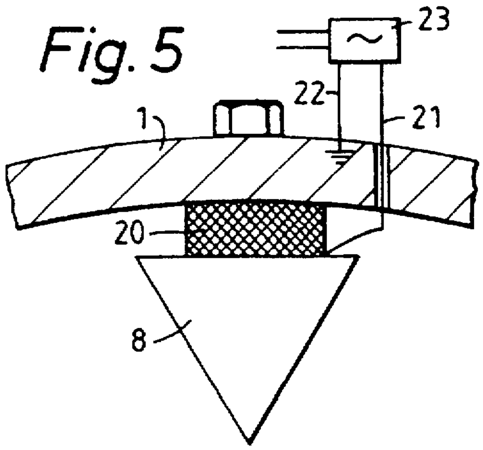
FIG. 5 shows a detail of a rib attached to a piezoelectric or magnetostrictive material.

FIG. 5 shows a detail of a rib 4 attached to a piezoelectric or magnetostrictive material 20 receiving oscillating energy via the cables 21 and 22 from the generator 23.

Figure 6:
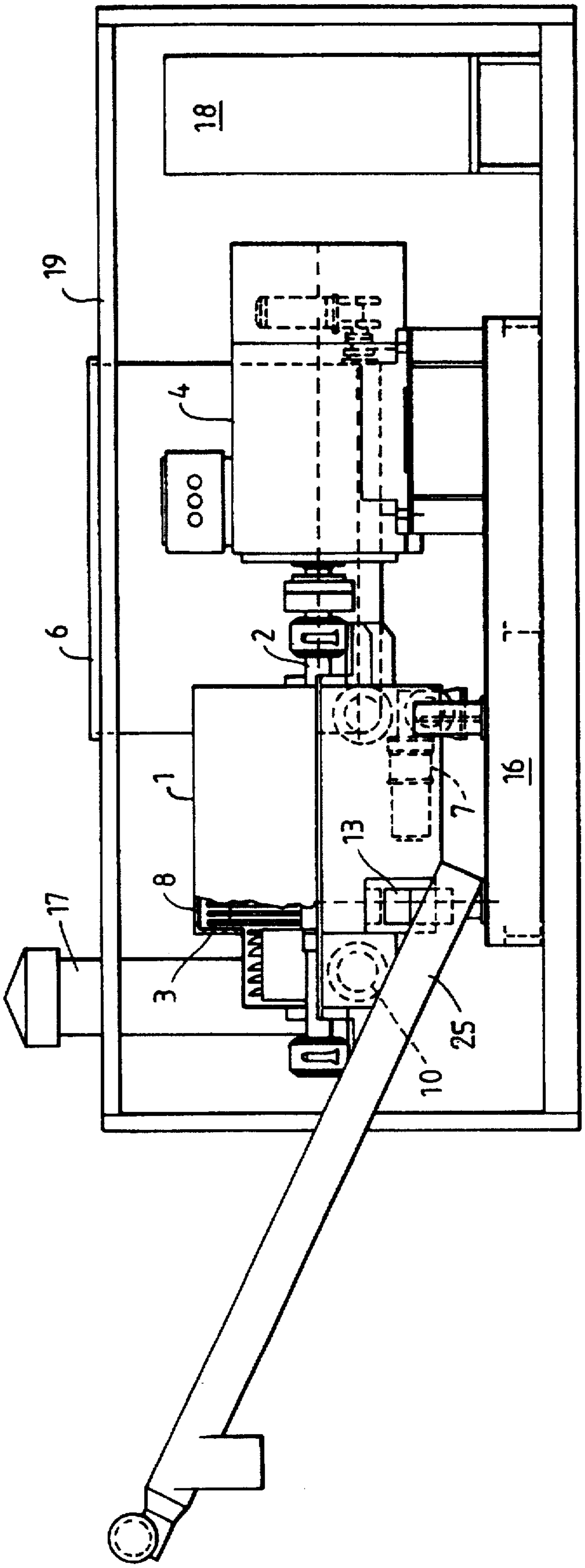
FIG. 6 shows a side view of an embodiment example for an apparatus of 450 $kW_o$.

FIG. 6, where the reference numbers have the same significance as in FIG. 1, also shows a screw conveyor 25 for the solids and the machine skid 16 on which the construction is resting. It further shows the blowoff pipe 17 for exhaust gases and mist being led to the open air. The control booth 18 for the process is situated at the end of the engine. The whole assembly is built into a 20 foot standard ISO container 19.

Figure 7:
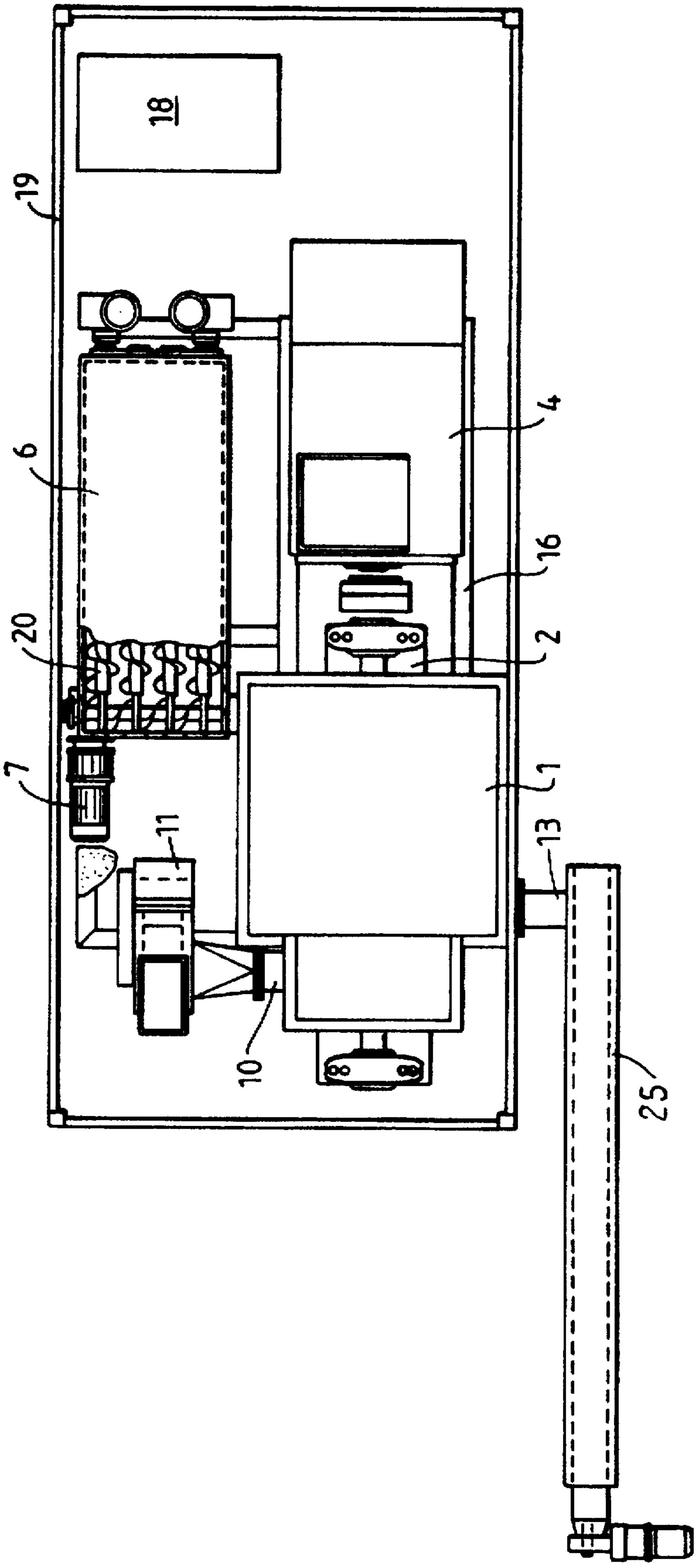
FIG. 7 shows a front view of the same embodiment example.

FIG. 7 shows a top view of the same embodiment example, including the blowoff aperture 10 for the exhaust gases and mist, the vent fan 11 and the feed conveyor 5 in the hopper 6. In the hopper are 4 transverse feed conveyors, whose only function is to feed the material on to feed conveyor 5.

Figure 8:
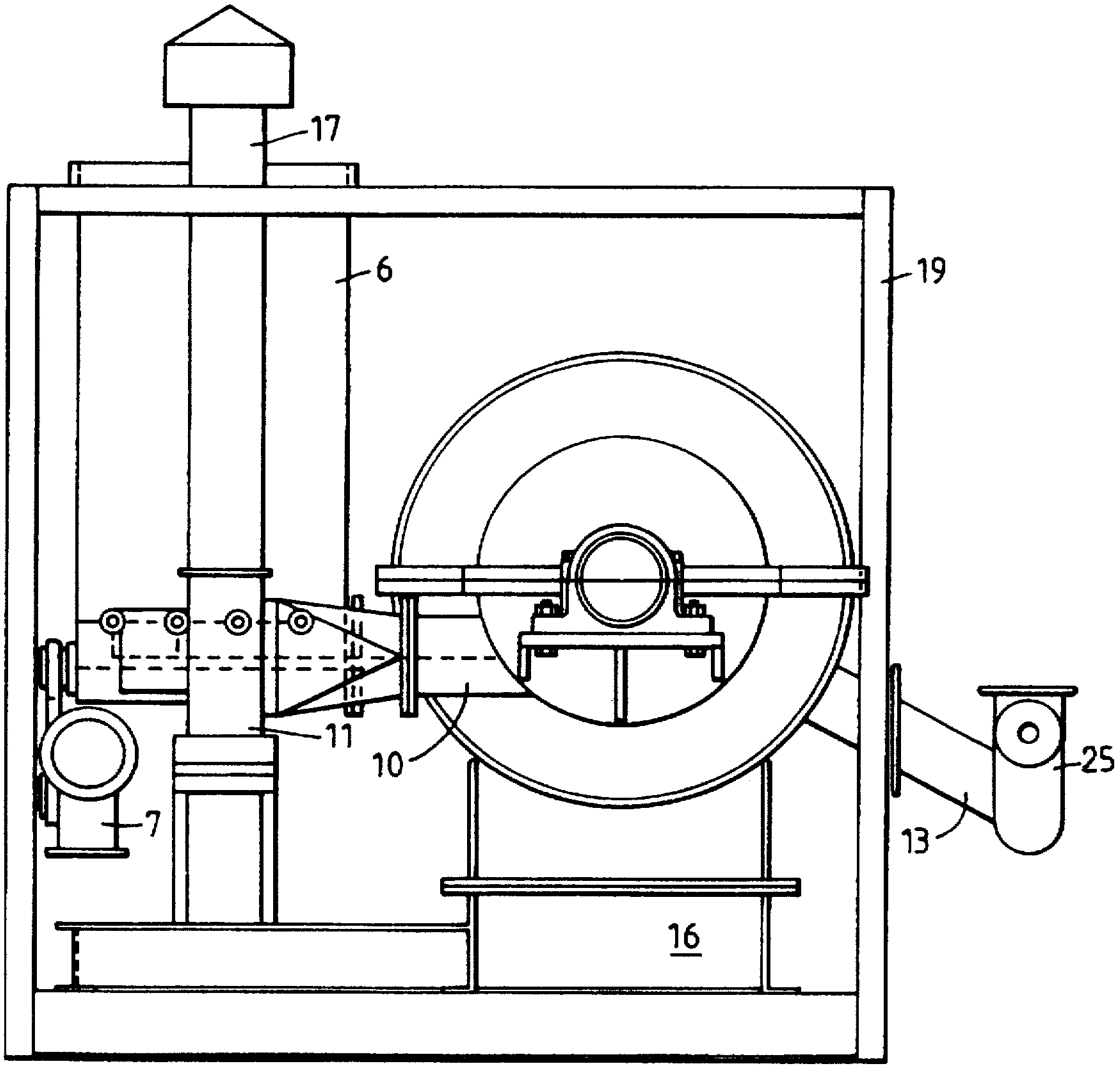
FIG. 8 shows the embodiment example seen from one end.

FIG. 8 shows an end view from the left hand side of the embodiment shown in FIG. 6.

I claim:

1. Apparatus for drying of organic or inorganic materials or mixtures thereof, the materials containing one or more liquids, where drying occurs by removing said liquid or liquids as atomized droplets from the solids in the form of a mist, said apparatus comprising:

a process chamber with an inlet opening for the material to be dried, said process chamber having an inner wall;

a rotor rotatably supported about an axis of the process chamber, the periphery of said rotor together with the opposing inner wall of the process chamber defining an annulus in the process chamber, the rotor including on its periphery oscillating rotor blades, and said inner wall of the process chamber having substantially axially oriented ribs, said rotor blades on rotation causing the material fed to the input opening to move radially outwardly of the rotating rotor so that the liquid or liquids are removed from the solid materials and said rotor blades being sufficiently closely spaced to the opposing ribs to impart turbulence during said rotation to the liquid outwardly removed from the solid materials and said oscillating rotor blades imparting vibrations to said liquid so as to form a mist.

2. Apparatus as claimed in claim 1, wherein each blade is pivotably supported on an axis parallel to the axis of rotation of the rotor.

3. Apparatus as claimed in claim 1, wherein the rotor blades are designed with highly turbulence-generating backs as viewed in the direction of rotation.

4. Apparatus as claimed in claim 1, wherein the rotor blades are designed in the shape of tuning forks.

5. Apparatus as claimed in claim 1, wherein a magnetic oscillator is arranged outside the inner wall of the process chamber, and the rotor blades are associated with a magnetostrictive material.

6. Apparatus as claimed in claim 1, wherein the ribs are in the form of oscillating elements.

7. Apparatus as claimed in claim 6, wherein the ribs are mounted on piezoelectric ceramic or magnetostrictive material.

8. A method of drying organic or inorganic material or a mixture thereof, said material containing a liquid or liquids, which comprises introducing said material interiorly of a rotating rotor carrying on its periphery oscillating rotor blades, said rotor rotating about the axis of a process chamber having an inner surface with substantially axially extending ribs, said rotating rotor causing the material introduced interiorly of said rotor to be propelled radially outwardly of said axis of rotation and to expel liquid or liquids from said materials, and the oscillating rotor blades and the opposing ribs causing vibrational forces and turbulence to be induced into the outwardly flowing liquid so as to form a mist.

9. A method according to claim 8, which includes introducing heated gas into the process chamber to provide additional energy for drying of the material.

10. A method according to claim 8, in which the material is waste material.

11. A method according to claim 8, in which the ribs are caused to oscillate by means of a frequency modulator applied from the outside of the process chamber.

* * * * *